United States Patent [19]

Cryan et al.

[11] Patent Number: 5,553,179
[45] Date of Patent: Sep. 3, 1996

[54] VARIED INSERTION LOSS FIBER OPTIC COUPLING AND METHOD OF MAKING SAME

[75] Inventors: Colm V. Cryan, Arlington; David W. Stowe, Milford; Margaret M. Parslow, Auburn, all of Mass.

[73] Assignee: Porta Systems Corp., Syosset, N.Y.

[21] Appl. No.: 200,780

[22] Filed: Feb. 22, 1994

Related U.S. Application Data

[63] Continuation-in-part of Ser. No. 169,512, Dec. 17, 1993, Pat. No. 5,408,554.

[51] Int. Cl.⁶ .............................. G02B 6/28; C03B 37/15
[52] U.S. Cl. .................. 385/43; 385/42; 385/46; 385/51; 65/406; 65/408; 65/409; 65/410; 65/411
[58] Field of Search .................. 385/31, 39, 42, 385/43, 46, 48, 51, 95, 96, 99; 65/406, 408, 411, 385, 402, 376, 409, 410

[56] References Cited

U.S. PATENT DOCUMENTS

| | | | |
|---|---|---|---|
| 3,912,478 | 10/1975 | Presby | 385/28 X |
| 4,083,625 | 4/1978 | Hudson | 385/42 X |
| 4,136,929 | 1/1979 | Suzaki | 385/42 X |
| 4,253,727 | 3/1981 | Jeunhomme et al. | 385/42 X |
| 4,256,365 | 3/1981 | Lemesle et al. | 385/30 X |
| 4,291,940 | 9/1981 | Kawasaki et al. | 385/42 X |
| 4,315,666 | 2/1982 | Hicks, Jr. | 385/42 X |
| 4,342,499 | 8/1982 | Hicks, Jr. | 385/42 X |
| 4,386,822 | 6/1983 | Bergh | 385/11 X |
| 4,482,203 | 11/1984 | Stowe et al. | 385/50 X |
| 4,493,528 | 1/1985 | Shaw et al. | 385/42 X |
| 4,557,552 | 12/1985 | Newton et al. | 385/31 X |
| 4,812,001 | 3/1989 | Tomita et al. | 385/123 X |
| 4,906,068 | 3/1990 | Olson et al. | 385/43 X |
| 4,911,510 | 3/1990 | Jenkins | 385/147 X |
| 5,004,316 | 4/1991 | Hill et al. | 385/50 X |
| 5,011,251 | 4/1991 | Miller et al. | 385/43 X |
| 5,121,452 | 6/1992 | Stowe et al. | 385/46 |
| 5,138,676 | 8/1992 | Stowe et al. | 385/32 |
| 5,166,994 | 11/1992 | Stowe et al. | 385/48 |
| 5,175,779 | 12/1992 | Mortimore | 385/43 |
| 5,175,782 | 12/1992 | Bowen et al. | 385/46 X |
| 5,355,426 | 10/1994 | Daniel et al. | 385/39 |
| 5,367,591 | 11/1994 | Seike et al. | 385/51 |
| 5,408,554 | 4/1995 | Cryan et al. | 385/43 |

FOREIGN PATENT DOCUMENTS

| | | | |
|---|---|---|---|
| 53-91752 | 8/1978 | Japan | 384/42 X |
| 2126749 | 3/1984 | United Kingdom | 385/88 X |

OTHER PUBLICATIONS

Snyder et al., "Optical Waveguide Theory", *Institute of Advanced Studies, Australian National University*, chapter 23, pp. 474–486 (1983).

S. K. Sheem et al., "Single–mode fiberoptical power divider: encapsulated etching technique", *Optics Letter*, vol. 4, No. 1, Jan. 1979, p. 29.

Sharma et al., "Constant–Curvature Loss in Monomode Fibers: An Experimental Investigation", *Applied Optics*, vol. 23, No. 19, pp. 3297–3301, Oct. 1, 1994.

Cryan et al., "Annealed Twists for Stable Tuned Fused Polished Couplers", *Electronics Letters*, 1:53–54 (Jan. 1993).

(List continued on next page.)

*Primary Examiner*—Brian Healy
*Attorney, Agent, or Firm*—Hoffmann & Baron

[57] ABSTRACT

A varied ratio coupler, and a method of forming the same, constructed and arranged, in a unitary structure, to cause optical power in an input optical fiber to couple asymmetrically to at least two output optical fibers in a manner establishing different insertion losses between the input fiber and at least two output optical fibers. The coupler includes a central fiber surrounded by a close-packed ring of fibers. In certain preferred embodiments, the coupler has a bend that lies in a preselected plane and has a radius of curvature that is selected to provide the above difference in the insertion losses.

30 Claims, 10 Drawing Sheets

OTHER PUBLICATIONS

Birks et al., "Adiabaticity of Miniature Loops in Tapered Single–Mode Fibre", *Electronics Letters,* 28:2034–2035 (Oct. 1992).

Cryan et al., "Bending of Fused Polished Couplers", *Electronics Letters,* 28:2104–2105 (Oct. 1992).

O'Sullivan et al., "Wavelength–Flattened Response in Bent Fibre Couplers", *Electronics Letters,* 28:1485–1486 (Jul. 1992).

"Power Equalisation in 3×3 Fibre Couplers by Twist Tuning", *Electronics Letters,* 27:1087–1088 (Jun. 1991).

"Wavelength–Flattened Couplers: Performance Optimisation by Twist–Tuning", *Electronics Letters,* 25:407–408 (Mar. 1989).

Birks, "Twist–Induced tuning in tapered fiber couplers", *Applied Optics,* 28:4226–4233 (Oct. 1989).

Birks, "Practical tuning mechanism for fused–tapered couplers", *Optics Letters,* 13:1126–1128 (Dec. 1988).

Mortimore et al., "Monolithic Wavelength–Flattened 1×7 Single–Mode Fused Coupler", (Mar. 1989).

O'Sullivan, "Fused Tapered Single Mode Fibre Coupler Devices", thesis (Mar. 1993).

Szarka et al., "A Review of Biconical Taper Couplers", *Fiber & Integrated Optics,* vol. 3, Nos. 2–3, Jul. 1980, p. 285.

Campbell, "Jaws–A Coupler for Computer Rings", *SPIE,* vol. 479, May 1984, p. 86.

Olshansky, "Propagation in Glass Optical Waveguides", *Reviews of Modern Physics,* vol. 51, No. 2, Apr. 1979, pp. 341–367.

VARIED INSERTION LOSS FIBER OPTIC COUPLING AND METHOD OF MAKING SAME

CROSS REFERENCE TO RELATED APPLICATIONS

This application is a continuation-in-part of U.S. Ser. No. 08/169,512 filed Dec. 17, 1993, now U.S. Pat. No. 5,408,554.

BACKGROUND

The invention relates to varied insertion loss fiber optic coupling.

As used herein, the insertion loss Γ between an input fiber and an output fiber is defined as the fraction of input optical power coupled from the input fiber to the output fiber. Typically, this is expressed in dB as $$\Gamma = 10 \log (P_{output}/P_{input}) \quad (1)$$

where $P_{output}$ is the amount of optical power coupled to the output fiber, and $P_{input}$ is the amount of optical power originally launched into the input fiber.

In certain optical fiber communications applications e.g., in the cable television industry, it is desirable to employ an optical device that couples optical power received on an input optical fiber unequally to a number of output optical fibers (i.e., the optical device is constructed so that the output fibers have different insertion losses).

In one known approach, a number of conventional 1×2 fiber optic couplers that have different insertion losses are concatenated to provide a desired asymmetry in the optical power coupled to the output fibers.

Optical fiber communications applications that can benefit from improved varied insertion loss coupling, in addition to the cable television industry, include e.g., telecommunications, data communications, military applications, industrial controls, and medical applications. The proper design and operation of such optical communications systems can benefit substantially from readily available, reliable, and cost-effective couplers capable of selectively different coupling characteristics among the output fibers.

Fibers that are used for optical communication are waveguides that are generally made of transparent dielectrics whose function is to guide light over a distance.

An optical fiber may be classified in terms of the refractive index profile of the fiber and whether one mode (single-mode) or many modes (multi-mode) are capable of propagating in the fiber. If the core, which is typically made of a high-silica-content glass or a multi-component glass, has a uniform refractive index, it is called a step-index fiber. Graded-index fibers have non-uniform refractive index profiles that gradually decreases from the center toward the core-cladding interface.

The cladding surrounding the core has a uniform refractive index that is slightly lower than the refractive index of the core region. The cladding is generally made of a high-silica-content glass or a multi-component glass.

SUMMARY

According to a first aspect of the invention, a fiber optic coupler is provided for coupling optical power from an input optical fiber to at least two output optical fibers, the coupler is formed from constituent fibers comprising a central fiber, and multiple surrounding fibers extending along the central fiber and arranged in at least one close-packed ring around the central fiber in a coupling region, each of the multiple surrounding fibers touching neighboring surrounding fibers and the central fiber, the multiple surrounding fibers and the central fiber being drawn a selected length while being fused together in the coupling region to form a coupler of generally circular cross-section, at least a plurality of the constituent fibers comprising optical fibers each having an optical core and a surrounding cladding, one of the optical fibers being an input fiber and at least two of the optical fibers being output fibers, the coupler being constructed and arranged to cause optical power in the input optical fiber to couple nonuniformly to the at least two output optical fibers in a manner establishing different insertion losses between the input fiber and the at least two output optical fibers, whereby the coupler, in a unitary structure, provides a difference in the respective insertion losses between the input fiber and at least two of the output fibers.

The inventors have discovered a simple, cost-effective, space-efficient unitary structure for providing a difference in the insertion losses between an input fiber and at least two output fibers.

Preferred embodiments of this aspect of the invention have one or more of the following features.

In certain preferred embodiments, the central fiber is an optical fiber having an optical core and a surrounding cladding. In these embodiments, the central fiber is the input optical fiber. The length the fibers are drawn (e.g., between about 0.2 cm and 2 cm) and the normalized fused width is preferably selected to provide a wide-band insertion loss response. The response band of the coupler preferably spans a range that includes 1250 nm and 1600 nm. Preferably, the central fiber and the surrounding fibers are fused together in a manner characterized by a normalized fused width of between about 0.2 and 0.6.

As used herein, the term wide-band insertion loss response means that the insertion loss is substantially wavelength insensitive over a relatively wide wavelength range. In other words, the response of the coupler does not vary significantly with wavelength.

In a preferred embodiment, the coupling region has a bend that lies in a preselected plane. Preferably, the radius of curvature of the bend and the orientation of the preselected plane is selected to provide a difference in the respective insertion losses between the input fiber and the at least two output optical fibers.

Certain preference embodiments further comprise a bend support structure constructed and arranged to substantially maintain the coupling region in the preselected bent configuration.

The bend support preferably comprises a pedestal contacting the coupling region in a limited length contact region, and fiber securing points spaced from the pedestal securing the coupler in bent condition about the pedestal, the pedestal and the relative position of the securing regions being configured to substantially maintain the coupling region in the selected bent configuration.

Alternatively, the bend support comprises a groove constructed and arranged to receive the coupling region and to protect it in its selected bent configuration.

The inventors have discovered a means for securing a bend in the coupler without causing substantial power loss. The substrate and the pedestal allows tension to be maintained in the coupling region, which thereby provides vibrational stability to the coupler and provides reliable and stable insertion losses among the output fibers.

In some embodiments, the coupler is subject to unrelieved bending stress and the bend support structure is constructed to resist reactive stresses and maintain the coupler in the bent condition. In other embodiments, the coupler is substantially free of bending stress as a result of annealing.

The multiple surrounding fibers are preferably twisted about the central fiber in the coupling region with a desired twist pitch. The twist pitch is preferably selected to provide a difference in the respective insertion losses between the input fiber and at least two output fibers. In preferred embodiments, the twist pitch is between about 0.5 cm and 5 cm.

In other preferred embodiments, at least one of the constituent fibers of the coupler is a spacer fiber that has no optical core.

In certain of these embodiments, the central fiber is an optical fiber, and the at least one spacer fiber is arranged in the at least one close-packed ring. The multiple surrounding fibers are preferably twisted about the central fiber in the coupling region with a desired twist pitch. Preferably, the twist pitch and the position of the at least one spacer fiber, relative to the other surrounding fibers, is selected to provide a difference in the respective insertion losses between the input fiber and the at least two output optical fibers.

In yet other embodiments of the invention, a first of the output optical fibers has a different refractive index profile than the refractive index profile of a second of the output optical fibers. The difference in refractive index profiles is preferably selected to provide a difference in the respective insertion losses between the input fiber and the first and second output fibers.

In certain embodiments, a first of the output optical fibers has a different cross-sectional diameter than a second of the output optical fibers, the difference in cross-sectional diameters of the first and second output fibers being selected to provide a difference in the respective insertion losses between the input fiber and the first and second output fibers.

In a preferred embodiment, the central fiber and the multiple surrounding fibers comprise seven fibers having substantially equal cross-sectional diameters, wherein six of the seven fibers surround the remaining one of the seven fibers to form the close-packed ring.

According to this aspect, the invention features a 1×N (N taking an integer value of 2, 3, 4, 5, or 6) fiber optic coupler formed from constituent fibers comprising a central input optical fiber having an optical core and a surrounding cladding, and six surrounding fibers extending along the central fiber and arranged in a close-packed ring around the central fiber in a coupling region of selected length, each of the six surrounding fibers touching neighboring surrounding fibers and the central fiber. Each of the six surrounding fibers has a diameter substantially equal to the diameter of the central fiber. The six surrounding fibers and the central fiber are drawn and fused together in the coupling region. N of the six surrounding fibers are output optical fibers each having an optical core and a surrounding cladding, the remaining 6-N of the multiple surrounding fibers being spacer fibers not having optical cores. The coupler is constructed and arranged to cause optical power in the input optical fiber to couple nonuniformly to the N output optical fibers in a manner establishing different insertion losses between the input fiber and at least two of the N output optical fibers.

In another aspect, the invention features a method for forming a fiber optic coupler comprising the steps of: (a) providing a plurality of fibers, one of the plurality of fibers being an input optical fiber, and at least two of the plurality of fibers being output optical fibers, each of the optical fibers having an optical core and a surrounding cladding; (b) arranging one of the plurality fibers as a central fiber and at least some of the remaining fibers as surrounding fibers in sufficient number to provide at least one close-packed ring of fibers, wherein each of the fibers in the ring touches neighboring surrounding fibers and the central fiber; (c) drawing the surrounding fibers and the central fiber a desired length, while fusing; and (d) bending the coupling region in a preselected plane, the radius of curvature and the orientation of the preselected plane being selected to substantially achieve a difference in the respective insertion losses between the input fiber and the at least two output optical fibers.

A preferred embodiment comprises the additional step of fixing the coupling region by a bend support structure constructed and arranged to substantially maintain the coupling region in a desired bent configuration.

Certain preferred embodiments include the step of substantially annealing out stresses in the coupler that are caused by bending.

In preferred embodiments, the sum of the diameters of the surrounding fibers of which the coupler is formed is slightly less than the sum of diameters of a ring of a number of circles, equal to the number of surrounding fibers, closely-packed about the central fiber in a plane transverse to the longitudinal axis of the central fiber in a manner providing, during manufacture, slight space in the ring of surrounding fibers to accommodate process-related shifts of the geometric relationship of the fibers to one another, so that, after manufacture, a close-packed relationship of the fibers to one another exists.

Preferably, in those embodiments that employ helical twisting of the surrounding fibers to obtain stable contact between all neighboring fibers prior to fusion so that during the fusing process the surrounding fibers fuse together and with the central fiber into a unitary optical structure, the amount by which the sum of diameters of the surrounding fibers is less than the sum of diameters of the ring circles is determined, at least in major part, to accommodate the slight elliptical shape of the cross-section of the surrounding fibers, taken transversely to the axis of the central fiber, attributable to their helical twist relative to the central fiber, so that the close-packed relationship of the fibers to one another is obtained.

Other features and advantages will become apparent from the following description and from the claims.

DESCRIPTION

FIG. 12 is perspective side view, shown in partial cross-section.

Figure 1:
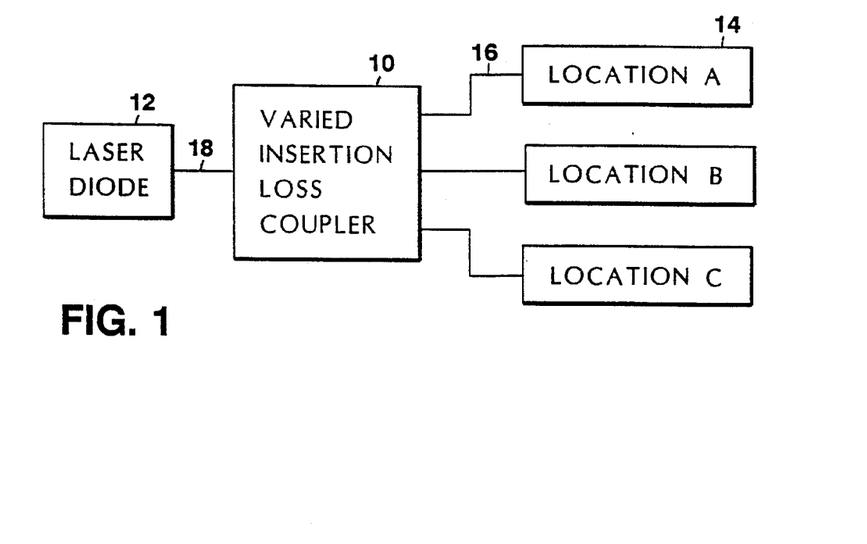
FIG. 1 is a schematic diagram of a 1×3 varied insertion loss fiber optic coupler employed in a light-wave communications system.

Referring to FIG. 1, a 1×3 varied insertion loss coupler 10 according to the invention nonuniformly couples a coded pulse stream of light representing voice, video, or data, from a suitable light source 12, e.g., a semiconductor light emitting diode or an injection-laser diode, to three different final receiving stations 14, by means of optical output fibers 16.

The final receiving stations are located at different distances from light source 12, and consequently the optical paths to the different receiving stations have different amounts of power loss, and thus the level optical power received by each of the receiving stations is attenuated differently. The insertion losses between the input fiber 18 and the three output fibers 16 of the varied insertion loss coupler are made to be different in a manner selected to optimize the efficiency of the optical communications system.

At the final receiving stations the light pulses are converted to electrical signals, decoded, and converted into a desired form of information (e.g., visual and sound information).

Figure 2:
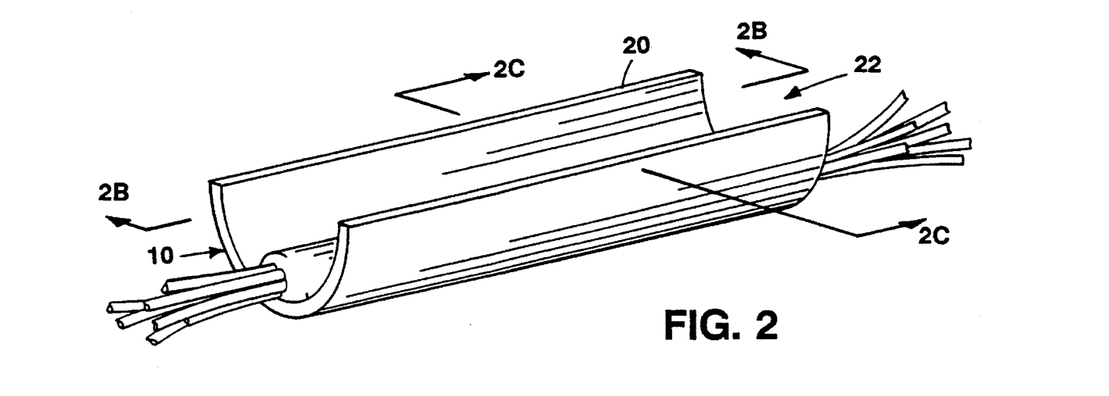
FIG. 2 is a perspective diagram of the internal components of the 1×3 varied insertion loss fiber optic coupler of FIG. 1.
Figure 2A:
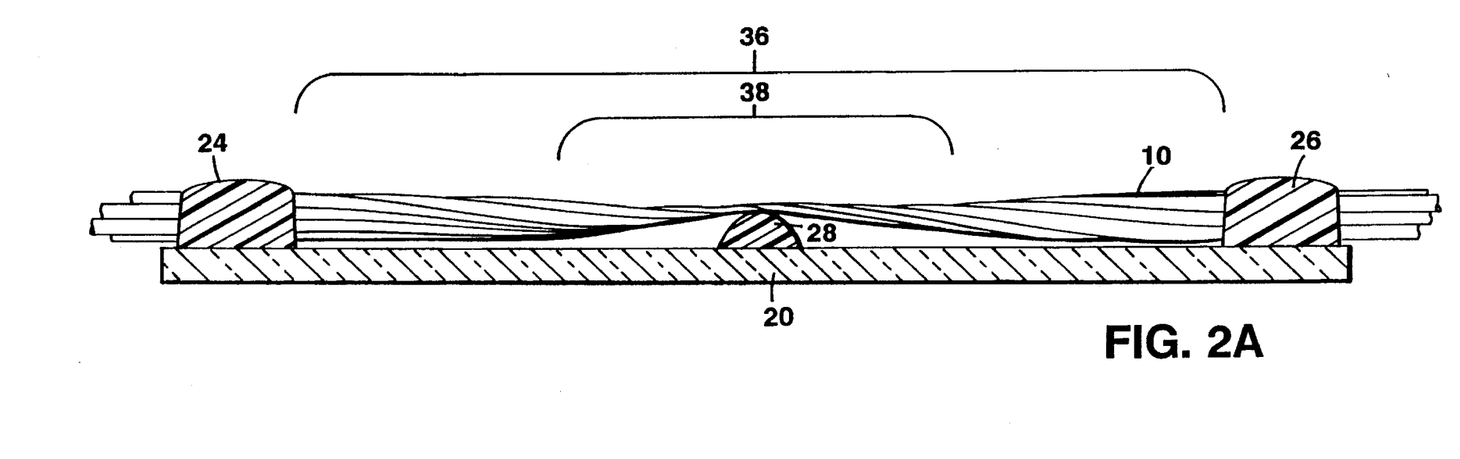
FIGS. 2A and 2B are cross-sectional views of the 1×3 coupler taken along the lines 2A—2A and 2B—2B, respectively.
Figure 2B:
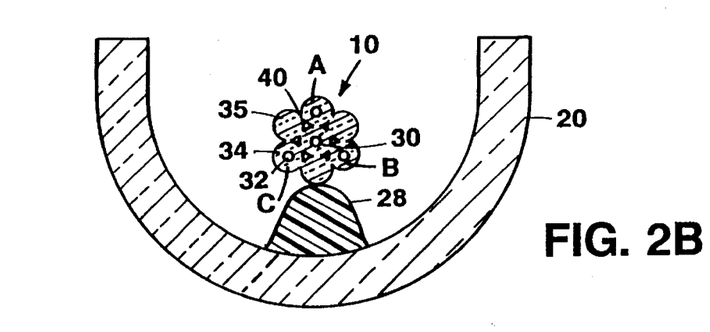

Referring to FIGS. 2–2B, 1×3 varied insertion loss coupler 10 is mounted in a substrate 20. The substrate is preferably made from a U-shaped fused silica rod 22. The substrate provides protection and stability to the coupler.

As shown in FIG. 2A, the coupler is fixed to the substrate by means of securing bonds 24, 26, (e.g., a commercial epoxy which has good bonding characteristics to glass, such as 353 NDT or 353 ND epoxy, available from Epoxy Technology of Billerica, Mass., U.S.A.).

The coupler is bent over a pedestal 28 in a manner that achieves the desired difference in the insertion losses between the coupler input and the respective outputs. The pedestal is preferably bonded to the substrate at a location spaced between securing bonds 24, 26, and is formed from e.g., epoxy, fused silica glass, or silicon rubber. In preferred embodiments the pedestal has a refractive index that is lower than the refractive index of the cladding of the optical fibers so as to minimize the perturbation of light propagating through the coupler.

A shown in FIG. 2B, fiber optic coupler 10 is formed from a ring of six cylindrical fibers, that have substantially equal diameters, surrounding a central cylindrical input optical fiber 30. Three of the surrounding fibers are output optical fibers having optical cores 32 and surrounding cladding 34, while the other three fibers 35 are spacer fibers that have no optical cores.

During fabrication, fiber optic coupler 10 is fused and drawn to form a biconical tapered region 36 of about 0.2–3 cm in length, that includes a coupling region 38 of about 5 mm in length, in which a major proportion (e.g., about 99%) of the optical coupling occurs. The inventors note that in presently preferred embodiments none of the bending occurs in the transitions regions.

Because the diameter of the coupling region is reduced by more than 75% (e.g., to a final diameter of about 50 µm) during the fuse-drawing process, most of the bend caused by the pedestal occurs in the coupling region 38. This bend is selected during fabrication, as described in detail below, to provide the desired difference in the respective insertion losses between the central input fiber 30 and the output optical fibers in the surrounding ring.

The fused portion of the resulting coupler has a length of several millimeters to a few centimeters, depending in part upon the required difference between the output fiber insertion losses, and the degree of fusion achieved during the drawing stage. The insertion losses are determined, at least in part, by the diameter and length of the coupling region, as well as the degree to which the fibers have fused together.

The degree of fusion can be observed by noticing the void regions 40 (FIG. 2B), between the central fiber and any two neighboring surrounding fibers.

Figure 3:
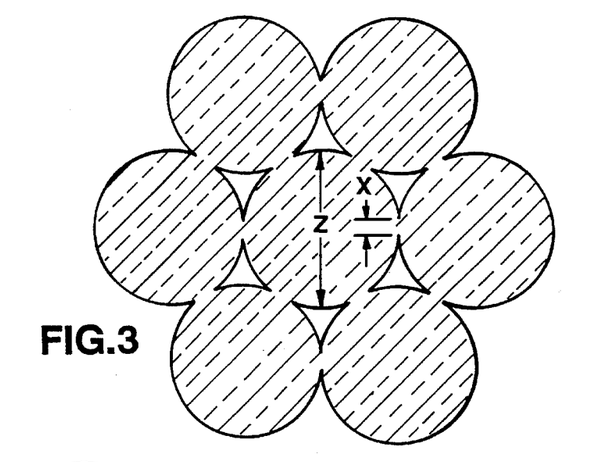
FIG. 3 is a schematic cross-sectional view of seven fused cylindrical fibers.

One measure of the degree of fusion of a first fiber 37 with a second fiber 39, shown in FIG. 3, is by a normalized fused width W, proposed in Mortimore et al., "Monolithic wavelength-flattened 1×7 single-mode fused fiber couplers: theory, fabrication, and analysis," *Applied Optics*, pp. 650–659 (Feb. 20, 1991), which is herein incorporated by reference. The normalized fused width W can be expressed as $$W=X/Z, \tag{2}$$

where X is the distance separating the void regions adjacent the two fibers, and Z is the diameter of first fiber 37.

Couplers of the invention can be made to have very little fusion between the constituent fibers, in which case the void regions are more pronounced and the fibers appear to retain more of their original boundaries.

In preferred varied ratio fiber optic couplers, the constituent fibers of the coupler are fused to have an average normalized fused width of between about 0.2 and 0.6.

Prior to fabrication, the central and surrounding optical fibers begin as single-mode telecommunications fibers of about 125 µm outer diameter. The plastic buffer that covers each of the constituent fibers is removed in a predetermined active region, and the active region of each of the fibers is solvent-cleaned to remove grease and other contaminants.

The diameter of the surrounding fibers, and the diameter of the central fiber D, are pre-sized (e.g., by etching, by drawing as described by Stowe et al., in U.S. Pat. No. 5,121,452 (assigned to the present assignee) which is incorporated herein by reference, by employing a combination of etching and drawing, by deposition, by longitudinal compression, or by adding a sleeve of e.g., cladding material, of appropriate thickness about the central or surrounding fibers.)

The sum of the diameters of the surrounding fibers is slightly less than the sum of diameters of a ring of a number of circles, equal to the number of surrounding fibers, that each have a diameter d and that are closely-packed about the central fiber in a plane transverse to the longitudinal axis of the central fiber. The ratio d/D, of the diameter of the circles (d) to the central fiber diameter (D), as given by the diameter-ratio-equation:

$$d/D=\sin(\pi/N)/(1-\sin(\pi/N)), \quad (3)$$

where N is the number of fibers in the surrounding close-packed ring.

The sum of the diameters of the surrounding fibers 12 are reduced by a small amount (e.g., by the above-mentioned techniques) relative to the sum of the diameters of the above circles in a manner that provides, during manufacture, slight space in the ring of surrounding fibers to accommodate process-related shifts of the geometric relationship of the fibers to one another, as explained in U.S. Ser. No. 08/169,512, filed Dec. 12, 1993 (assigned to the present assignee), which is herein incorporated by reference, so that, after manufacture, a close-packed relationship of the fibers to one another is obtained.

The diameters of one or all of the surrounding fibers may be appropriately reduced, prior to fusion, to compensate for process-related shifts in the geometric relationship of the constituent fibers to one another. The sum of the diameters of the surrounding fibers should be toleranced to within about a micron for optimal coupler performance.

When every fiber is reduced by the same amount, for a typical 1×6 fused tapered coupler, formed from fibers with diameters of 125 μm, the reduction in the diameter of the surrounding fibers relative to the sum of diameters of a ring of six circles that are closely-packed about the central fiber, in a plane transverse to the longitudinal axis of the central fiber, is of the order of about 0.5 μm.

For N fibers positioned around one central fiber, the apparent increase in diameter Δd of each of the surrounding fibers, caused by the helical twist, can be expressed in general form by equation 4, below $$\Delta d = f(N, D, P) \quad (4)$$

in which D is the diameter of the central fiber, P is the pitch of the helical twist, and f is a generalized function of these parameters. Using simple geometric arguments, and ignoring secondary considerations, such as Poisson's ratio, the apparent increase in fiber diameter can be approximated by equation 5, below $$\Delta d = \pi^2/(2P^2) \, (D/(1-\sin(\pi/N)))^3 \sin(\pi/N) \quad (5)$$

In a preferred embodiment, each of the surrounding fibers is reduced in diameter by substantially πd.

Figure 4:
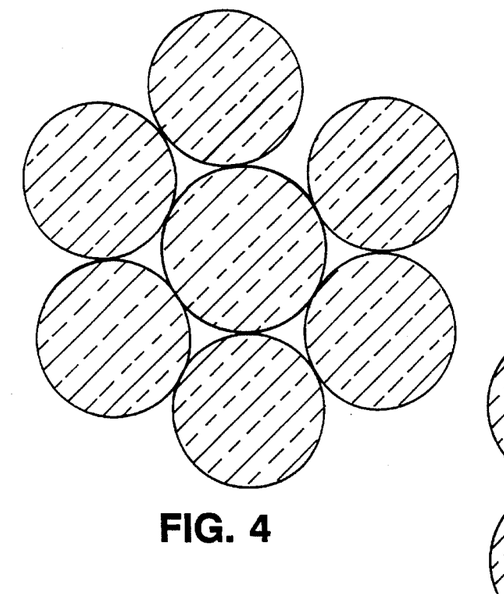
FIG. 4 is a cross-sectional schematic view of a preferred seven fiber varied insertion loss coupler, prior to twisting of the surrounding fibers, in which the diameters of each of the surrounding fibers have been reduced by substantially the same amount to compensate for a subsequent helical twist of the surrounding fibers.

As shown schematically in FIG. 4, before the surrounding fibers have been twisted about the central fiber, in which the diameters of each of the surrounding fibers have been reduced by πd, resulting in a slight space (shown exaggerated) in the ring of surrounding fibers.

Figure 4A:
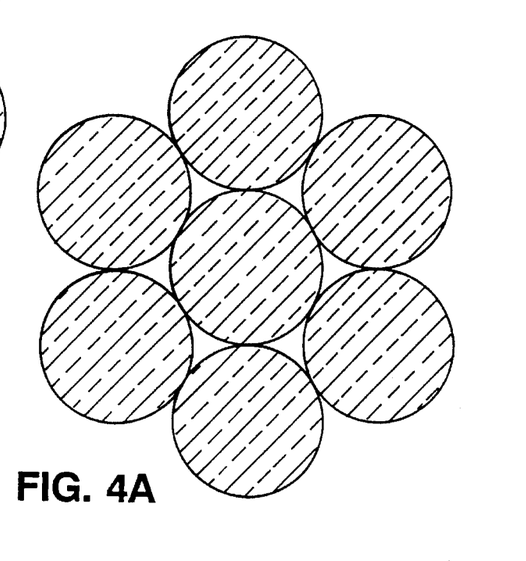
FIG. 4A is a cross-sectional schematic view of coupler of FIG. 4, after the surrounding fibers have been helically twisted about the central fiber, thereby taking up the slight space in the ring of surrounding fibers in the coupler of FIG. 4.

As shown in FIG. 4A, close-packing of the constituent fibers is achieved in the coupler of FIG. 4 when the surrounding fibers have been helically twisted about the central fiber. We note that the surrounding fibers shown in FIG. 4A are shown as having circular cross-sections, however, in reality they should have slightly elliptical cross-sections.

Figure 5:
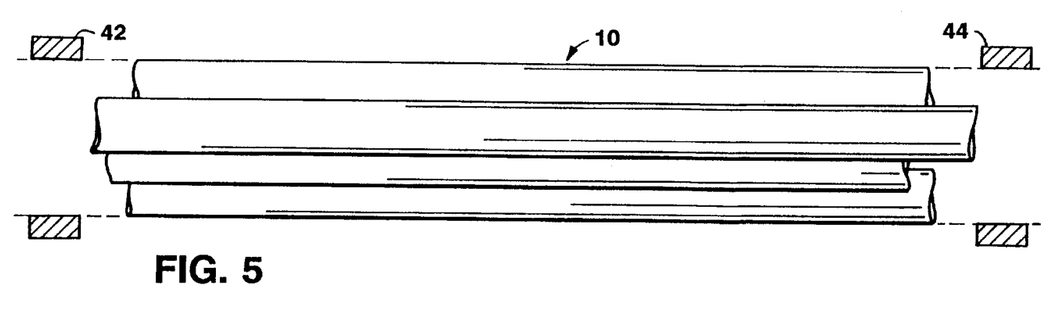
FIGS. 5—5D are perspective views illustrating a preferred method of manufacturing a bent varied insertion loss coupler.

As shown in FIG. 5, prior to the fusing process, the individual pre-sized fibers are arranged and aligned in a close-packed configuration. The coupler is mounted into the clamps of two translation stages 42, 44.

Figure 5A:
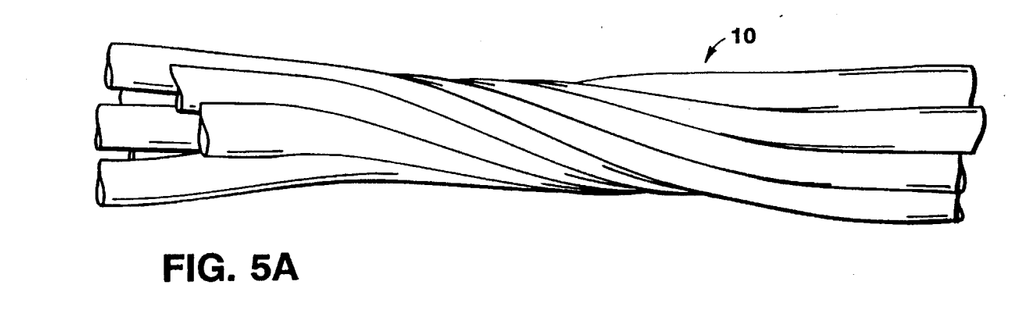

To create a radial force that facilitates uniform fusing of the constituent fibers the surrounding fibers may be helically twisted as shown in FIG. 5A, prior to, or during fusion.

Depending on the desired insertion losses among the output fibers of the coupler, the coupling region may have a fractional turn or several turns. The twist pitch of the surrounding fibers is typically between 0.5 cm and 5 cm.

Figure 5B:
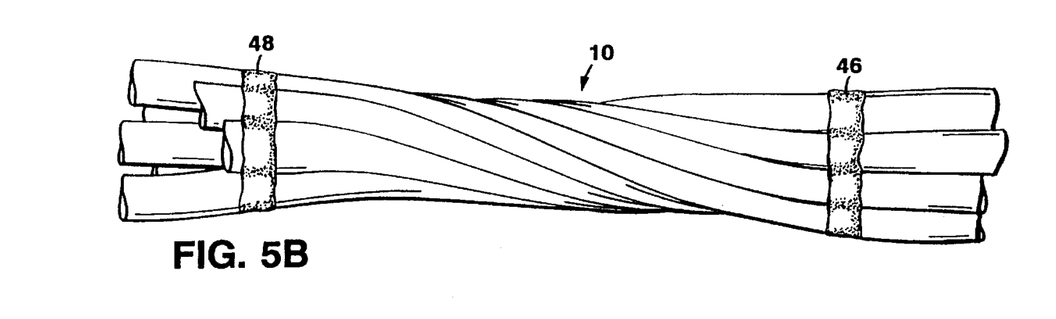

Referring to FIG. 5B, once the surrounding fibers have been twisted about the central fiber in a desired manner, the relative positions of the fibers can be secured by fiber stabilizers 46 and 48 (e.g., beads of 353 NDT or 353 ND epoxy). The stabilizers are typically spaced at least about 2 mm from the region that will be heated during the fusing process to prevent the epoxy from becoming overly heated.

Alternatively, the relative positions of the fibers can be fixed by means of a quick fusion provided by pulses of laser radiation from a $CO_2$ laser.

Figure 5C:
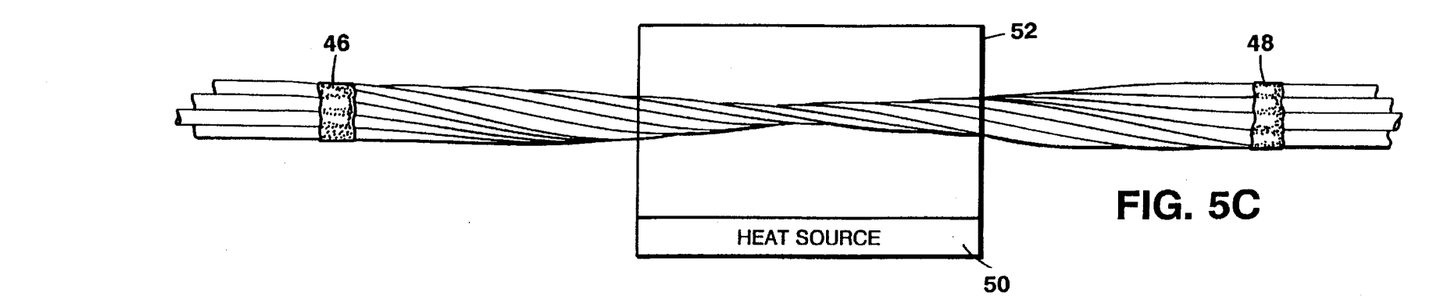

Referring to FIG. 5C, a heat source 50 (e.g., a torch, an electrically heated resistive wire, an electric arc, or a laser) is applied over a relatively narrow (e.g., about 20 mm) heat zone 52 across the coupler until a suitable working temperature is obtained, at which point one or both translation stages 42, 44, are moved apart to elongate the heated region (these processes are normally referred to as unidirectional or bi-directional drawing, respectively).

The translation stages are separated to draw the coupler a length selected to achieve a wide-band coupling response that preferably spans the wavelength range from 1250 nm to 1600 nm. In certain preferred embodiments, the coupler is drawn between about 0.2 and 3 cm.

During fabrication, coupler 10 is fused and drawn to form tapered region 36 and coupling region 38 (FIG. 2A), in which the originally selected ratio of diameters d/D is essentially preserved.

Following the drawing process, the coupler can be twisted slightly while the heated region is still soft to achieve a fine tuning of the coupling response prior to the bending step. This twisting can also be used to remove any twist-induced stresses that may have resulted during the fuse-drawing step.

Figure 5D:
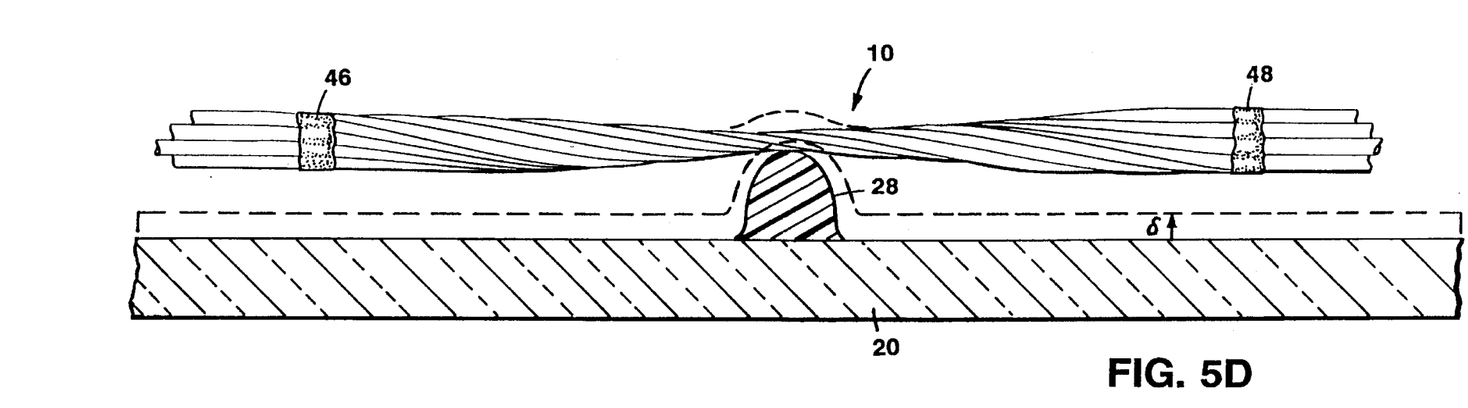

Referring to FIG. 5D, following the fuse-drawing process, varied ratio fiber optic coupler 10 is rotated until the proper orientation of the constituent fibers of the coupler, relative to a plane of bending 54 (i.e., the plane of the drawing shown in FIG. 5D), is achieved. For example, in the relationship shown in FIG. 2B, the plane of bending passes through the center of fiber A and through the center of the spacer fiber that lies between the optical fibers B and C. A rotation of the coupler cross-section relative to the plane of bending can be used to shift the relationship of the insertion losses of the output fibers to different values.

Substrate 20 is then moved (e.g., by a vertical translation stage) toward coupler 10 until pedestal 28 just touches the coupler in coupling region 38 (solid lines).

The pedestal is then translated an amount δ toward the coupler (dashed lines). Typically, δ is between about 0 and 5 mm.

The radius of curvature of the resultant bend of the coupler is selected to achieve the desired insertion losses, while avoiding the creation of significant excess loss in the device (e.g., less than about 0.05 to 0.1 dB). Assuming the bend is taken up entirely in a coupling region of length L, and assuming the bend has a uniform radius along this length, the radius of curvature R can be approximated as a function of δ by the following expression:

$$R = L^2/(8\delta) \quad (6)$$

Figure 6:
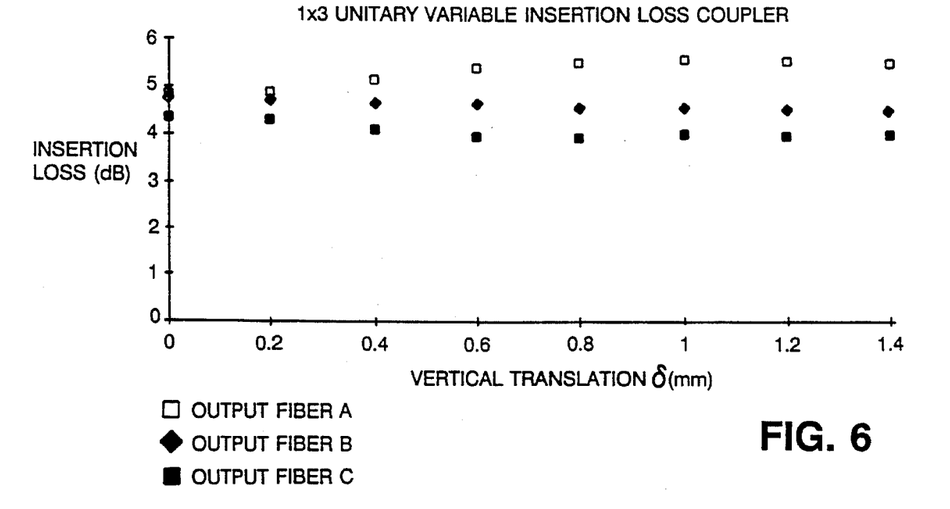
FIGS. 6 and 6A are graphs of insertion loss versus vertical translation for 1×3 and 1×6 unitary varied insertion loss couplers, respectively.

As shown in FIG. 6, the insertion losses between the input fiber and the constituent output fibers of a 1×3 varied insertion loss coupler (see FIG. 2B) vary as a function of the vertical translation δ. The differences in the insertion losses tend to increase as δ increases from 0 mm.

Figure 6A:
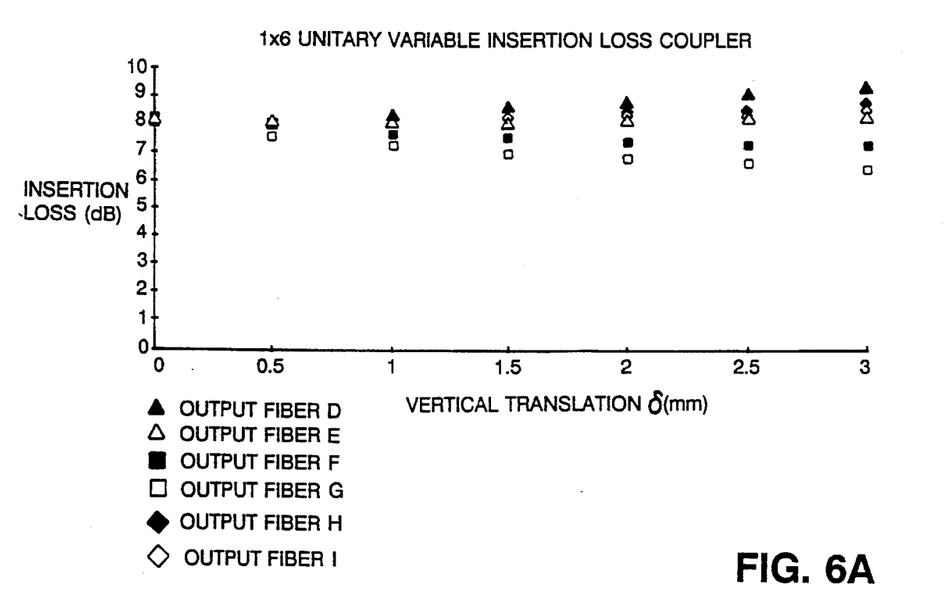

Referring to FIG. 6A, the relative insertion losses of the constituent output fibers of a 1×6 structure (see FIG. 7A) also vary as δ increases.

During the bending process, light is coupled into the input optical fiber, and is detected in the output optical fibers. The bending is continued until the amount of light coupled between the input and output fibers achieves the desired insertion loss.

Following the bending step, the fibers that extend from the coupling region are bonded to substrate 20 with adhesive bonds 24, 26. This structure is then enclosed in a tube and an adhesive sealant is used at the end of the tube to protect the coupler. Typically, the input fiber is terminated at the output side of the coupler. The entire structure may then be encapsulated in a protective stainless steel tube.

The nonuniform optical characteristic of the output fibers with respective to each other and the input fiber, resulting from the coupler structure according to the invention, causes the desired difference in the insertion losses. Because the output optical fibers present different optical paths to the light in the input fiber, the light couples differently to the various output fibers.

One means for achieving such nonuniformity is to create, in the coupler, unequal propagation constants for the light traveling in the various output fibers. Alternatively, or in addition, the coupler be constructed to provide unequal coupling strengths between the input fiber and the different output fibers.

The unequal propagation constants of the output fibers causes light to couple nonuniformly between the output fibers. The degree that each output fiber couples to the input fiber increases as the propagation constant of the output fiber approaches the propagation constant of the input fiber, while the amount of insertion loss between an output fiber and an input fiber increases as the difference between the propagation constants of the output and input fibers increases.

Similarly, the coupling strengths between the input and the output fibers, as measured by how quickly light couples from the input fiber to each of the output fibers, can be varied in a manner to achieve the desired varied insertion loss.

Bending the coupler according to the invention modifies the optical phase velocities and the coupling strengths of the constituent output optical fibers.

Also, as a result of fabricating the coupler according to the invention, different bending stresses exist between the output optical fibers that lie above and those that lie below the neutral strain axis. These stresses may play a role, through an elasto-optic effect, in determining the resulting insertion losses. The adhesive bonds 24, 26, securing the coupler to the substrate, are constructed to resist these reactive stresses and maintain the coupler in the desired bent configuration.

In certain embodiments, however, the bending stresses are substantially removed by annealing. Annealing is preferred for those couplers that are susceptible to accelerated failure mechanisms caused by such bending stresses.

Depending upon the particular arrangement of optical and spacer fibers, the twist pitch of the coupler can be selected to achieve a nonuniform optical characteristic to provide the desired difference in the respective insertion losses between the input fiber and at least two of the output fibers.

Figure 7:
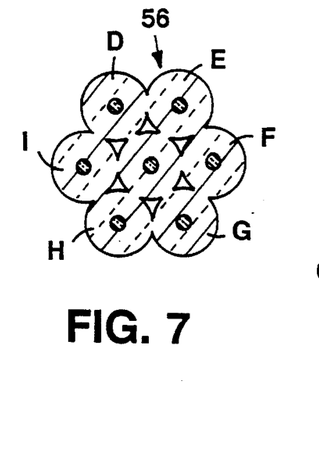
FIGS. 7—7F are schematic cross-sectional views of the constituent fiber arrangements of various varied insertion loss fiber optic couplers that comprise a central fiber surrounded by a close-packed ring of fibers.
Figure 7A:
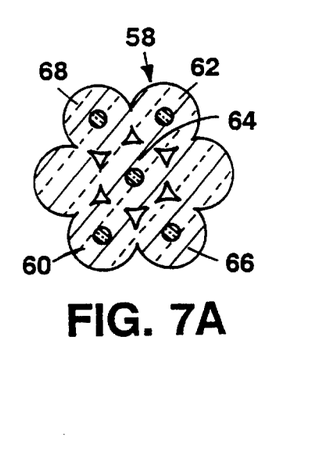
Figure 7B:
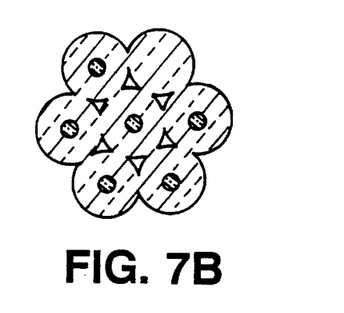
Figure 7C:
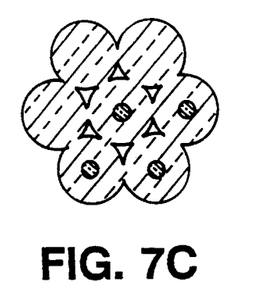
Figure 7D:
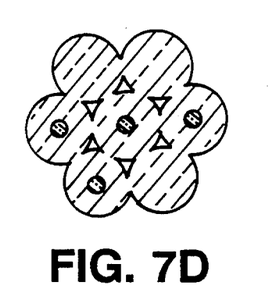
Figure 7E:
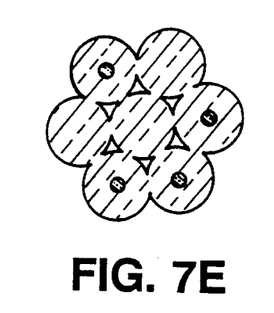
Figure 7F:
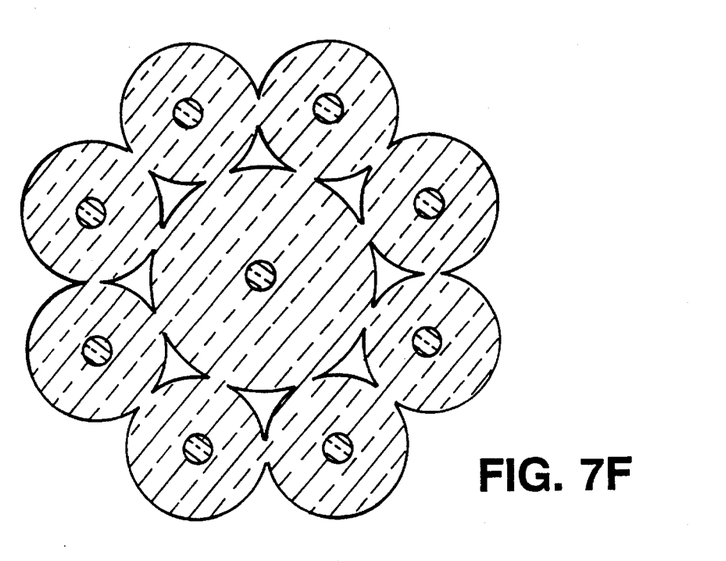

Referring to FIGS. 7–7F, various arrangements of optical and spacer fibers are illustrated that can be employed in a bent coupler in accordance with the present invention to provide desired insertion losses.

A 1×6 azimuthally symmetric unitary coupler 56, shown in FIG. 7, can be made to operate with a desired difference in the insertion losses between the input fiber and the output fibers by bending according to the invention.

As shown in FIG. 7A, a 1×4 unitary coupler 58 can be made to have a nonuniform output by twisting. In other words, when coupler 58 is twisted, optical fibers 60 and 62 tend to couple substantially the same amount of power from the input fiber 64, and optical fibers 66 and 68 tend to couple substantially the same amount of optical power from the input fiber. By introducing a bend in the coupler, as described above, in a plane selected so that the constituent fibers in each of the fiber pairs 60, 62 and 66, 68 have substantially different bend radii, the coupling degeneracy can be broken to provide a 1×4 coupler with four different insertion losses between the input and output fibers.

FIGS. 7B–7D show alternative varied ratio coupler fiber arrangements in which a central optical fiber is surrounded by a close-packed ring of six fibers.

As shown in FIG. 7E, the central fiber can be a spacer fiber 70, and one of the surrounding optical fibers can be used as the input fiber (e.g., fiber 72) to provide a 1×3 varied ratio coupler.

As shown in FIG. 7F, a central optical fiber 74, is surrounded by a close-packed ring of eight optical fibers to provide a 1×8 varied ratio fiber optic coupler.

Figure 8:
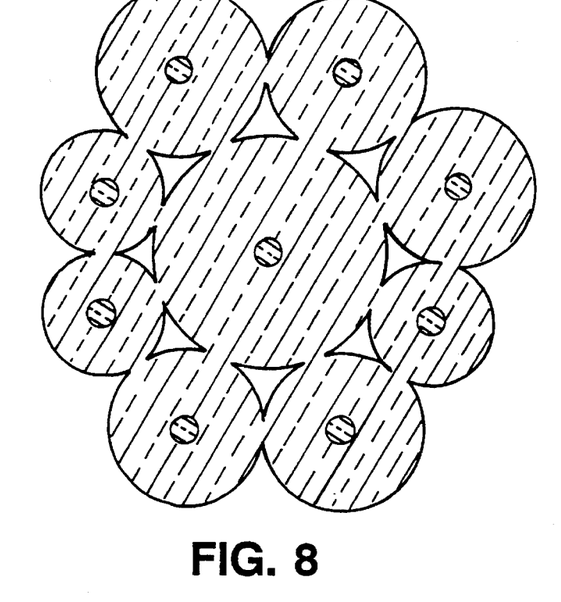
FIGS. 8–11 is a cross-sectional view of the constituent fiber arrangements of alternative varied insertion loss fiber optic couplers.

Referring to FIG. 8, a 1×8 coupler, formed from a central optical fiber surrounded by a close-packed ring of eight fibers each having a cladding with a different diameter, inherently has different insertion losses between the central input fiber and the surrounding optical fibers. This coupler structure can also be twisted and bent to achieve a desired coupling response.

Figure 9:
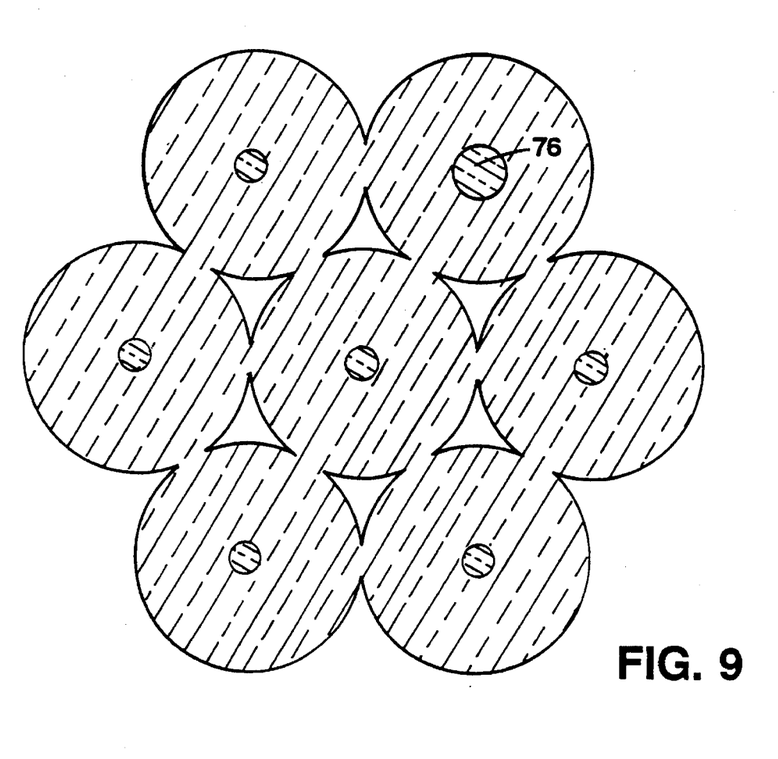

As shown in FIG. 9, a core 76, can be enlarged e.g., by core diffusion, to provide a 1×6 varied insertion loss coupler.

Figure 10:
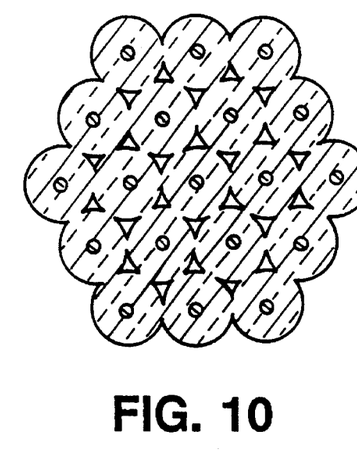

Referring to FIG. 10, a central optical fiber is surrounded by an inner ring of six close-packed fibers, which is in turn surrounded by a second ring of twelve close-packed optical fibers. This structure can be bent in the manner described above to provide a desired varied ratio coupler.

Figure 11:
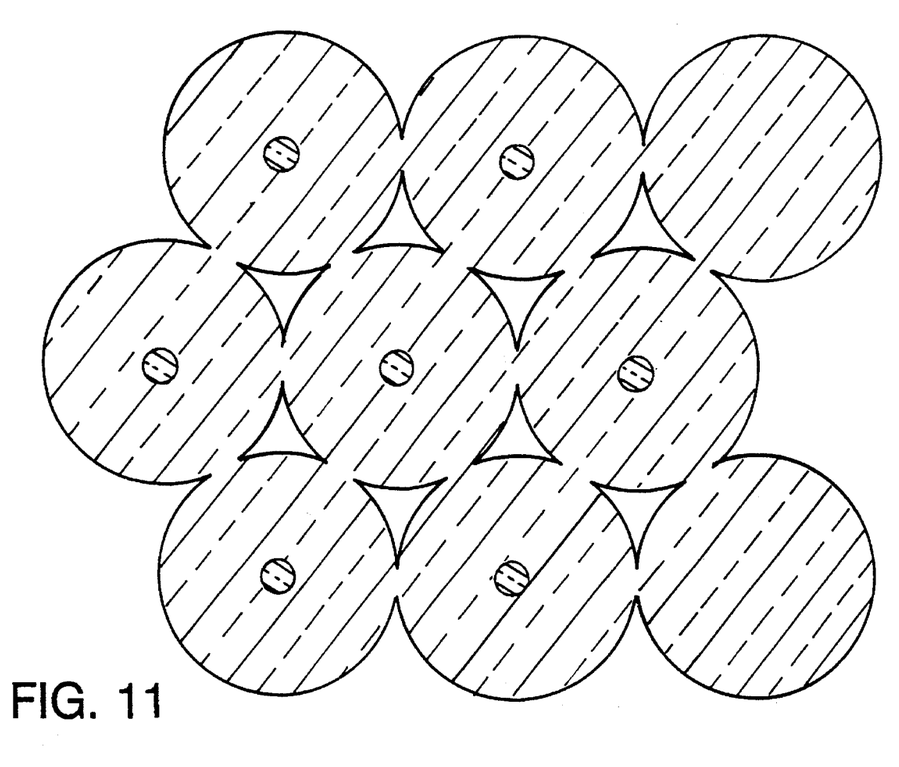

As shown in FIG. 11, additional spacer fibers can be positioned asymmetrically outside an inner ring of six close-packed fibers to provide a varied ratio 1×6 coupling response.

Figure 12:
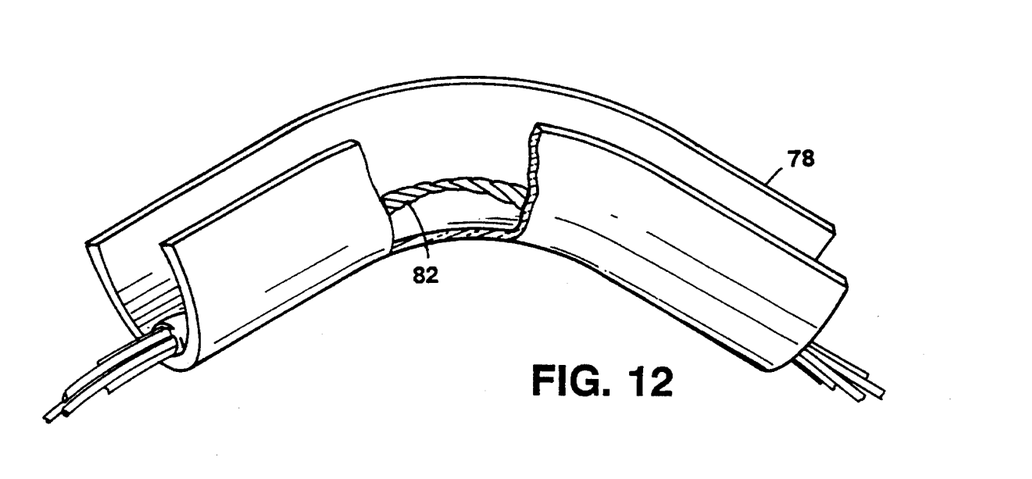
Figure 12A:
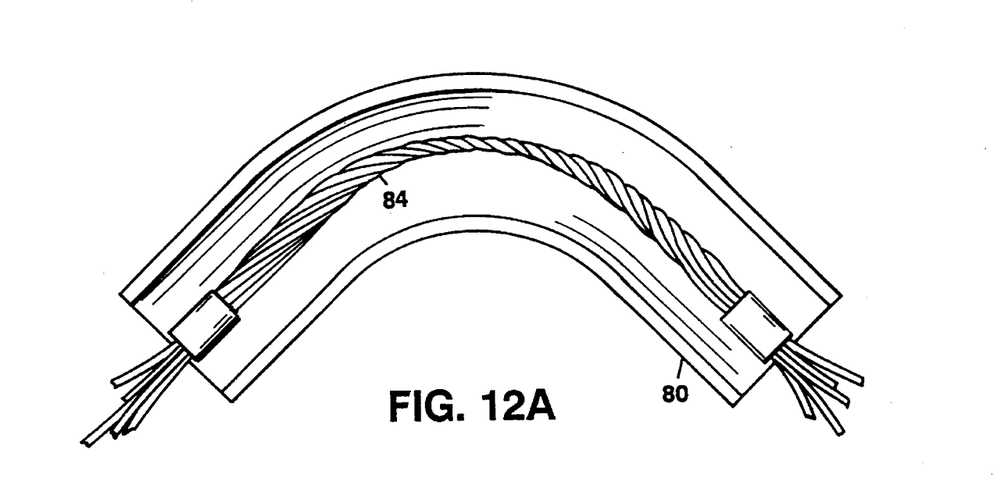
FIG. 12A is a pictorial top view, of alternative varied ratio couplers that employ curved substrates.

As shown in FIGS. 12 and 12A, curved substrates 78, 80 are employed to provide support for selected bent varied insertion loss couplers 82 and 84, respectively. In these arrangements a pedestal is not required, as the coupling region is freely suspended above substrates 78, 80.

Other embodiments are within the scope of the claims.

What is claimed is:

1. A fiber optic coupler for coupling optical power from an input optical fiber to at least two output optical fibers, said coupler formed from constituent fibers comprising:

a central fiber, said central fiber being an optical fiber having an optical core and a surrounding cladding; and multiple surrounding fibers extending along said central fiber and arranged in at least one close-packed ring around said central fiber in a coupling region, each of said multiple surrounding fibers touching neighboring surrounding fibers and said central fiber, said multiple surrounding fibers and said central fiber being drawn a selected length while being fused together in said coupling region to form a coupler of generally circular cross-section, at least a plurality of said constituent fibers comprising optical fibers each having an optical core and a surrounding cladding, one of said optical fibers being an input fiber and at least two of said optical fibers being output fibers, said coupler being constructed and arranged with at least one of:

bending of said coupling region in a preselected plane;

twisting of said surrounding fibers about said central fiber in said coupling region;

selection of a first of said output optical fibers to have a different cross-sectional diameter than a second of said output optical fibers;

selection of a first of said output fibers to have a different refractive index profile than a second of said output optical fibers;

selection of at least one of said surrounding fibers as a spacer fiber having no optical core;

in order to cause optical power in said input optical fiber to couple nonuniformly to said at least two output optical fibers, whereby said coupler, in a unitary structure, provides a difference in the respective insertion losses between said input fiber and at least two of said output fibers;

wherein said central fiber and said surrounding fibers are fused together in a manner characterized by a normalized fused width of between about 0.2 and 0.6.

2. The fiber optic coupler of claim 1 wherein said central fiber is said input optical fiber.

3. The fiber optic coupler of claim 2 wherein the length said fibers are drawn is selected to provide a wide-band coupling response.

4. The fiber optic coupler of claim 3 wherein the response band of said coupler spans a wavelength range that includes 1250 nm and 1600 nm.

5. The fiber optic coupler of claim 3 wherein said fibers are drawn a length between about 0.2 cm to 3 cm.

6. A fiber optic coupler for coupling optical power from an input optical fiber to at least two output optical fibers, said coupler formed from constituent fibers comprising:

a central fiber, and multiple surrounding fibers extending along said central fiber and arranged in at least one close-packed ring around said central fiber in a coupling region, each of said multiple surrounding fibers touching neighboring surrounding fibers and said central fiber, said multiple surrounding fibers and said central fiber being drawn a selected length while being fused together in said coupling region to form a coupler of generally circular cross-section, at least a plurality of said constituent fibers comprising optical fibers each having an optical core and a surrounding cladding, one of said optical fibers being an input fiber and at least two of said optical fibers being output fibers, wherein said coupling region has a bend that lies in a preselected plane, the radius of curvature of said bend and the orientation of said preselected plane being selected to provide a difference in the respective insertion losses between said input fiber and said at least two output optical fibers, whereby said coupler, in a unitary structure, provides a difference in the respective insertion losses between said input fiber and at least two of said output fibers.

7. The fiber optic coupler of claim 6 further comprising a bend support structure constructed and arranged to substantially maintain said coupling region in the selected bent configuration.

8. The fiber optic coupler of claim 7 wherein said bend support comprises a pedestal contacting said coupling region in a limited length contact region, and fiber securing points spaced from said pedestal securing said coupler in bent condition about said pedestal, said pedestal and the relative position of said securing regions being configured to substantially maintain said coupling region in the selected bent configuration.

9. The fiber optic coupler of claim 7 wherein said bend support comprises a groove constructed and arranged to receive said coupling region and to protect it in its selected bent configuration.

10. The fiber optic coupler of claim 7 wherein said coupler is subject to unrelieved bending stress and said bend support structure is constructed to resist reactive stresses and maintain said coupler in said bent condition.

11. The fiber optic coupler of claim 6 wherein said coupler is substantially free of bending stress as a result of annealing.

12. A fiber optic coupler for coupling optical power from an input optical fiber to at least two output optical fibers, said coupler formed from constituent fibers comprising;

a central fiber, and multiple surrounding fibers extending along said central fiber and arranged in at least one close-packed ring around said central fiber in a coupling region, each of said multiple surrounding fibers touching neighboring surrounding fibers and said central fiber, said multiple surrounding fibers and said central fiber being drawn a selected length while being fused together in said coupling region to form a coupler of generally circular cross-section, at least a plurality of said constituent fibers comprising optical fibers each having an optical core and a surrounding cladding, one of said optical fibers being an input fiber and at least two of said optical fibers being output fibers, wherein said multiple surrounding fibers are twisted about said central fiber in said coupling region with a desired twist pitch, said twist pitch being between about 0.5 μm and 5 cm and being selected to provide a difference in the respective insertion losses between said input fiber and at least two output fibers, whereby said coupler, in a unitary structure, provides a difference in the respective insertion losses between said input fiber and at least two of said output fibers.

13. A fiber optic coupler for coupling optical power from an input optical fiber to at least two output optical fibers, said coupler formed from constituent fibers comprising:

a central fiber, and multiple surrounding fibers extending along said central fiber and arranged in at least one close-packed ring around said central fiber in a coupling region, each of said multiple surrounding fibers touching neighboring surrounding fibers and said central fiber, said multiple surrounding fibers and said central fiber being drawn a selected length while being fused together in said coupling region to form a coupler of generally circular cross-section, at least a plurality of said constituent fibers comprising optical fibers each having an optical core and a surrounding cladding, one of said optical fibers being an input fiber and at least two of said optical fibers being output fibers, said central fiber being an optical fiber having an optical core and a surrounding cladding, and at least one of said constituent fibers of said coupler being a spacer fiber that has no optical core, said at least one spacer fiber being arranged in said at least one close-packed ring, said multiple surrounding fibers being twisted about said central fiber in said coupling region with a desired twist pitch, said twist pitch and the position of said at least one spacer fiber, relative to the other surrounding fibers, being selected to provide a difference in the respective insertion losses between said input fiber and said at least two output optical fibers.

14. The fiber optic coupler of claim 1 wherein said first of said output optical fibers has a different refractive index profile than the refractive index profile said second of said output optical fibers, said difference in refractive index profiles being selected to provide a difference in the respective insertion losses between said input fiber and said first and second output fibers.

15. The fiber optic coupler of claim 1 wherein said first of said output optical fibers has a different cross-sectional diameter than said second of said output optical fibers, said difference in cross-sectional diameters of said first and second output fibers being selected to provide a difference in the respective insertion losses between said input fiber and said first and second output fibers.

16. A fiber optic coupler for coupling optical power from an input optical fiber to at least two output optical fibers, said coupler formed from constituent fibers comprising:

central fiber, and multiple surrounding fibers extending along said central fiber and arranged in at least one close-packed ring around said central fiber in a coupling region, each of said multiple surrounding fibers touching neighboring surrounding fibers and said central fiber, said multiple surrounding fibers and said central fiber being drawn a selected length while being fused together in said coupling region to form a coupler of generally circular cross-section, at least a plurality of said constituent fibers comprising optical fibers each having an optical core and a surrounding cladding, one of said optical fibers being an input fiber and at least two of said optical fibers being output fibers, said coupler being constructed and arranged with at least one of:

bending of said coupling region in a proselected plane;

twisting of said surrounding fibers about said central fiber and said coupling region;

selection of a first of said output optical fibers to have a different refractive index profile than a second of said output optical fibers; and selection of at least one of said surrounding fibers as a spacer fiber having no optical core;

in order to cause optical power in said input optical fiber to couple nonuniformly to said at least two output optical fibers, wherein said central fiber and said multiple surrounding fibers comprise seven fibers having substantially equal cross-sectional diameters, wherein six of said seven fibers surround the remaining one of said seven fibers to form said close-packed ring.

17. A 1×N (N taking the integer value of 2, 3, 4, 5, or 6) fiber optic coupler for coupling optical power from an input optical fiber to N output optical fibers, said coupler formed from constituent fibers comprising:

a central input optical fiber having an optical core and a surrounding cladding, and six surrounding fibers extending along said central fiber and arranged in a close-packed ring around said central fiber in a coupling region of selected length, each of said six surrounding fibers touching neighboring surrounding fibers and said central fiber, each of said six surrounding fibers having a diameter substantially equal to the diameter of said central fiber, said six surrounding fibers and said central fiber being drawn and fused together in said coupling region, N of said six surrounding fibers being output optical fibers each having an optical core and a surrounding cladding, the remaining 6-N of said multiple surrounding fibers being spacer fibers not having optical cores, said coupler being constructed and arranged with at least one of:

bending of said coupling region in a preselected plane;

twisting of said surrounding fibers about said central fiber in said coupling region;

selection of a first of said output optical fibers to have a different cross-sectional diameter than a second of said output optical fibers;

selection of a first of said output optical fibers to have a different refractive index profile than a second of said output optical fibers;

selection of at least one of said surrounding fibers as a spacer fiber having no optical core;

in order to cause optical power in said input optical fiber to couple nonuniformly to said N output optical fibers, whereby said coupler, in a unitary structure, provides a difference in insertion losses between said input fiber and at least two of said output fibers.

18. The fiber optic coupler of claim 17 wherein said central fiber extends from an input port to said coupling region, after which it terminates.

19. The fiber optic coupler of claim 18 wherein the wavelength response band of said coupler spans a range that includes 1250 nm and 1600 nm.

20. The fiber optic coupler of claim 17 wherein said coupling region has a bend that lies in a preselected plane, the radius of curvature and the orientation of said preselected plane being selected to provide a difference in the respective insertion losses between said input fiber and said at least two output optical fibers.

21. The fiber optic coupler of claim 20 wherein said six surrounding fibers are twisted about said central fiber in said coupling region with a twist pitch, said twist pitch being selected to provide a difference in the respective insertion losses between said input fiber and said at least two output optical fibers.

22. The fiber optic coupler of claim 21 wherein said twist pitch and the positions of said 6-N spacer fibers, relative to the N surrounding optical fibers, are selected to provide a difference in the respective insertion losses between said input fiber and said at least two output optical fibers.

23. The fiber optic coupler of claim 17 wherein said first of said N output optical fibers has a refractive index profile different than the refractive index profile of said second of said N output optical fibers, said difference in said refractive index profiles being selected to provide a difference in the respective predetermined insertion losses between said input fiber and said first and second output fibers.

24. A method for forming a fiber optic coupler comprising the steps of:

(a) providing a plurality of fibers, one of said plurality of fibers being an input optical fiber, and at least two of said plurality of fibers being output optical fibers, each of said optical fibers having an optical core and a surrounding cladding;

(b) arranging one of said plurality fibers as a central fiber and at least some of the remaining fibers as surrounding fibers in sufficient number to provide at least one close-packed ring of fibers, wherein each of the fibers in said ring touches neighboring surrounding fibers and said central fiber;

(c) drawing said surrounding fibers and said central fiber a desired length, while fusing; and (d) bending said coupling region in a preselected plane, the radius of curvature and the orientation of said preselected plane being selected to substantially achieve a difference in the respective insertion losses between said input fiber and said at least two output optical fibers, whereby said method provides, in a unitary structure, a fiber optic coupler having a difference in the respective insertion losses between at least two of said output optical fibers and said input optical fiber.

25. The method of claim 24 further comprising the step of fixing said coupling region by a bend support structure constructed and arranged to substantially maintain said coupling region in a desired bent configuration.

26. The method of claim 24 further comprising the step of substantially annealing out stresses in said coupler introduced by bending.

27. The method of claim 24 further comprising the step of twisting said surrounding fibers around said central fiber with a desired twist pitch, and wherein at least one of said surrounding fibers is a spacer fiber that has no optical core, said twist pitch and the position of said at least one spacer fiber being selected to provide a difference in the respective insertion losses between said input fiber and said at least two output fibers.

28. A fiber optic coupler for coupling optical power from an input optical fiber to at least two output optical fibers, said coupler formed from constituent fibers comprising;

a central fiber, and multiple surrounding fibers extending along said central fiber and arranged in at least one close-packed ring around said central fiber in a coupling region, each of said multiple surrounding fibers touching neighboring surrounding fibers and said central fiber.

said multiple surrounding fibers and said central fiber being drawn a selected length while being fused together in said coupling region to form a coupler of generally circular cross-section, at least a plurality of said constituent fibers comprising optical fibers each having an optical core and a surrounding cladding, one of said optical fibers being an input fiber and at least two of said optical fibers being output fibers, said coupler being constructed and arranged with at least one of:

bending of said coupling region in a preselected plane;

twisting of said surrounding fibers about said central fiber in said coupling region;

selection of a first of said output optical fibers to have a different cross-sectional diameter than a second of said output optical fibers;

selection of a first of said output optical fibers to have a different refractive index profile than a second of said output optical fibers; and selection of at least one of said surrounding fibers as a spacer fiber having no optical core;

in order to cause optical power in said input optical fiber to couple nonuniformly to said at least two output optical fibers, wherein the sum of the diameters of said surrounding fibers of which the coupler is formed is slightly less than the sum of diameters of a ring of a number of circles, equal to the number of surrounding fibers, closely-packed about said central fiber in a plane transverse to the longitudinal axis of said central fiber in a manner providing, during manufacture, slight space in said ring of surrounding fibers to accommodate process-related shifts of the geometric relationship of the fibers to one another, so that, after manufacture, a close-packed relationship of the fibers to one another exists, whereby said coupler, in a unitary structure, provides a difference in the respective insertion losses between said input fiber and at least two of said output fibers.

29. The fiber optic coupler of claim 28 formed by a fusing process that employs helical twisting of the surrounding fibers to obtain stable contact between all neighboring fibers prior to fusion so that during the fusing process said surrounding fibers fuse together and with the central fiber into a unitary optical structure, and the amount by which said sum of diameters of said surrounding fibers is less than said sum of diameters of said ring circles is determined, at least in major part, to accommodate the slight elliptical shape of the cross-section of the surrounding fibers, taken transversely to the axis of the central fiber, attributable to their helical twist relative to the central fiber, so that said close-packed relationship of the fibers to one another is obtained.

30. The method of claim 24 further comprising the step of applying a fiber stabilizer to said plurality of fibers to fix the relative positions of said surrounding fibers and said central fiber prior to said drawing step.

* * * * *